(12) United States Patent
Demeur et al.

(10) Patent No.: US 6,454,119 B1
(45) Date of Patent: Sep. 24, 2002

(54) PORTABLE CONTAINER FOR PET LEASH

(76) Inventors: Basil E. Demeur, 1018 N. Forest, Oak Park, IL (US) 60302; Dale N. Padjen, 10820 32nd Ave., Pleasant Prairie, WI (US) 53158

( * ) Notice: Subject to any disclaimer, the term of this patent is extended or adjusted under 35 U.S.C. 154(b) by 0 days.

(21) Appl. No.: 09/820,606

(22) Filed: Mar. 30, 2001

(51) Int. Cl.[7] .................................................. A45F 1/04
(52) U.S. Cl. ...................................... 220/475; 224/667
(58) Field of Search ..................... 220/475; 224/194, 224/666, 667, 669, 269, 604, 605; 119/795

(56) References Cited

U.S. PATENT DOCUMENTS

| | | | | |
|---|---|---|---|---|
| 2,399,040 A | * | 4/1946 | Karle | 224/669 |
| 4,919,317 A | * | 4/1990 | Luedtke | 224/666 |
| 5,114,061 A | * | 5/1992 | Brady | 224/194 |
| 5,411,193 A | * | 5/1995 | Culp | 224/669 |
| 6,257,473 B1 | * | 7/2001 | Ringelstetter | |

* cited by examiner

*Primary Examiner*—Stephen Castellano
(74) *Attorney, Agent, or Firm*—Basil E. Demeur; Alan H. Samlan

(57) ABSTRACT

The invention relates to a portable container adapted for disengageable engagement with an animal pet leash. The device includes a container carrier clampable to a pet leash, the container carrier adapted to contain or carry a container and being removable therefrom. The container carrier includes a universal clamp which permits the device to be clamped to any format of animal pet leash.

5 Claims, 5 Drawing Sheets

PORTABLE CONTAINER FOR PET LEASH

FIELD OF THE INVENTION

The present invention relates to containers, and more particularly to portable containers adapted to attach to an animal pet leash for the purpose of carrying animal waste while the owner is walking the pet.

DESCRIPTION OF THE PRIOR ART

A number of systems have been devised heretofore for the purpose of permitting the pet owner to pick up and dispose of animal waste of their pets. This is especially apropos when an owner is walking and airing their pet. It has especially become desirable and in many instances, required by appropriate municipalities, that an owner be responsible for picking up animal waste caused by the owner's pet.

In connection with the above, various prior art patents show different systems for collecting animal waste. For example, U.S. Pat. No. 5,797,636, shows a disposable pet excrement collection device which is basically a flat collection device which can be pressed into a rigid collection funnel shape in order to scoop up the animal waste. This as well as other devices such as plastic gloves, paper bags, plastic bags, shovels and scoopers have been developed for the purpose of retrieving animal waste in order to remove it from public byways.

One of the difficulties and problems that has occurred repeatedly regardless of which type of collection system is employed is the fact that once the animal waste has been collected, the pet owner is required to carry the animal waste until the owner reaches a suitable dumpster or waste container where the waste may be disposed of properly.

In order to address that problem, a collection system and method of transportation has been disclosed in U.S. Pat. No. 5,713,616. The device disclosed in the aforementioned patent is designed as a pouch which the patent teaches can be carried on the belt of the pet owner permitting the pet owner to therefore collect the waste and deposit the same in the pouch to carry the same. This, however, has many drawbacks associated with the device, in that it is required that the owner carry the waste, and due to the nature of the container or pouch, all of the undesirable aspects of animal fecal matter are exposed.

A variety of collection devices have been proposed by the prior art, including that shown in U.S. Pat. No. 5,836,629 which basically relates to a plastic bag type device with two pouches for the operator's two hands, and scoops attached to the plastic pouch which allegedly permit the owner to collect the waste, and then flip the bag inside out in order to contain the same. The drawback with that device is that the pet owner must still carry the enclosed bag to an appropriate dumpster or waste container, wherever that may be located. Similar comments are applicable with respect to the device shown in U.S. Pat. No. 5,280,978 in that while it is a device intended to retrieve animal waste, the owner must still carry the device containing the animal waste until an appropriate waste container is located.

In terms of devices that attach to the leash, the only prior art which addresses that issue is U.S. Pat. No. 6,073,590 which discloses a pouch intended to be stitched to a leash just below the handle thereof, however, the pouch is simply intended to carry a plurality of plastic bags to be used by the owner in order to retrieve the animal waste. It is clear that the bag stitched to the lease is not intended to transport the animal waste once the same is collected, and indeed, the patent teaches that the pouch stitched to the animal leash is intended to carry a number of bags in order afford the owner easy access to a retrieval bag for retrieving and collecting the waste. However, it is clear that once collected, the pouch is not intended to transport the waste. Furthermore, the other drawback associated with the device shown in the +590 patent is the fact that once the pouch is stitched to the leash, it is a relatively permanent installation. Furthermore, the pouch is not removable from the leash and cannot be used on any leash. Hence, the device will be totally unworkable with a chain leash or a leather leash which does not lend itself to an easy stitching operation.

U.S. Pat. No. 5,363,809 shows a device for attaching a bag to the dog collar to make it accessible to the pet owner. However, there is no teaching of any transportation system once the waste has been collected.

The balance of the prior art dealing with animal waste collection systems basically deals with devices intended to pick up and/or collect the waste. This would include the scoopers and shovel type devices as well as bag like receptacles having cardboard or rigid material scoopers associated therewith as depicted in U.S. Pat. No. 3,767,247.

None of the prior art, however, has addressed the issue of providing a system for transporting the animal waste once the same is collected without the requirement that the owner hand carry the waste in the device utilized to collect the waste.

The present invention is directed to a portable transporting device which is easily and readily attachable to any pet animal leash, which therefore permits the owner of the pet to collect the waste in any appropriate collection device such as a glove, plastic bag or the like, and to be able to insert the collected waste into the container to be transported until a permanent waste container can be located so that the animal waste may be properly disposed of.

Furthermore, it is deemed important that the portable container be adaptable so that it is attachable to any format of pet animal leash regardless of the material from which the leash is composed. This would include leather leashes, corded leashes, retractable leashes, chain leashes, and any other presently available pet leash. Hence, it is deemed desirable to provide a container having a clamping system and a universal clamp such that the container may be mounted to any pet animal leash.

OBJECTS OF THE INVENTION

It is therefore the primary object of the present invention to provide a portable container including a clamping assembly which permits the container to be clamped to a pet animal leash for the purpose of carrying and transporting animal waste.

Another object of the present invention is to provide a portable container including a clamping system for clamping to an animal leash, wherein the clamping system is provided with a clip designed to be universally adaptable and attachable to any format of pet animal leash. This would include animal leashes made of leather, cloth, cords, chains, or the like.

A further object of the present invention is to provide a container for containing and transporting animal waste wherein the container is made of an easily cleanable material such that it may be cleaned and re-used for long periods of time. In this connection, the preferred embodiment of the device includes a container which is carried by a container carrier system with the container being removable from the container carrier for ease of disposal of the animal waste therein, as well as for cleaning purposes.

Further features of the invention will be understood by reference to the drawing and description set forth hereinbelow.

SUMMARY OF THE INVENTION

The present invention relates to a portable container for carrying animal waste and permitting the owner to transport the same once the animal waste is collected until the owner can locate a proper waste container for the proper disposition of animal waste. The container is designed to include a container carrying system which incorporates a universal clamp to permit the container carrier to be clamped to any format of pet animal leash whether the same be made of leather, cords, chains, or even if the same is a retractable type of pet leash. The container is ideally and preferably designed to be removable from the container carrier in order to empty the animal waste therefrom, and also to permit the owner to clean the same periodically for reuse. The container carrier is designed to easily and efficiently clamp to any pet leash, and to be easily removable there from such that it may be removed from the pet animal leash when the device is not intended to be used. Hence, there is no requirement that the container carrier system be permanently affixed to the leash which would therefore reduce its usability by the consumer. In other words, once the consumer has purchased a particular type of pet leash, the portable container system of the present invention is adapted to be used with such leash thereby eliminating the necessity of the owner purchasing a separate leash and pouch arrangement heretofore suggested by the art.

Further features of the invention will best be understood by reference to the accompanying drawings set forth below.

DETAILED DESCRIPTION OF THE INVENTION

Figure 1:
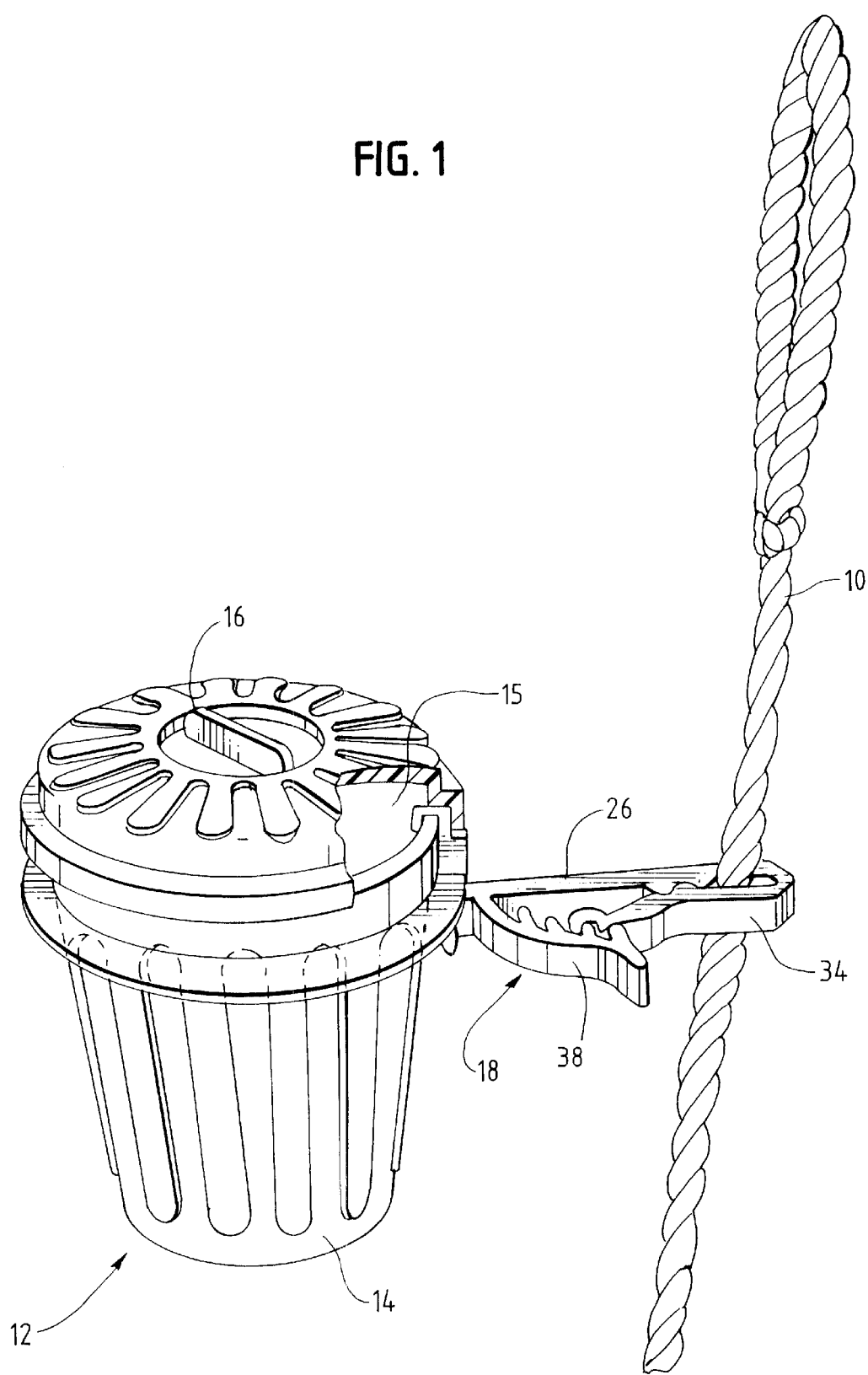
FIG. 1 is a plan view showing one embodiment of the animal waste container and associated container carrying system as attached to a typical leash.

Viewing first FIG. 1 of the drawings, a preferred embodiment of the invention is depicted therein. Throughout the present description, the animal leash will be referred to by the numeral 10 regardless of the type of leash which may be illustrated. It will be appreciated from the following description, however, that any type of pet animal leash may be employed in connection with the use of the present invention, including leather flat leashes, corded leashes, or chain leashes.

Turning to FIG. 1, there is shown an animal leash 10 to which is clamped the portable container and container carrier system 12 of the present invention. The container and carrier system 12 is shown to include a container 14 which in the preferred embodiment, is in the format of a plastic container having sidewalls, bottom walls, and an open top. The open top 15 is depicted by the cut away portion as shown at numeral 15. The container is enclosed by means of a top lid 16 which is removably engageable with the container 14. Typically, a plastic container such as 14 may be provided with a lid 16 which is engageable by means of a quarter turn with appropriate flanges and lips that interlock in order to lock the lid 16 onto the container 14. Such types of containers are well known in the container art.

Figure 2:
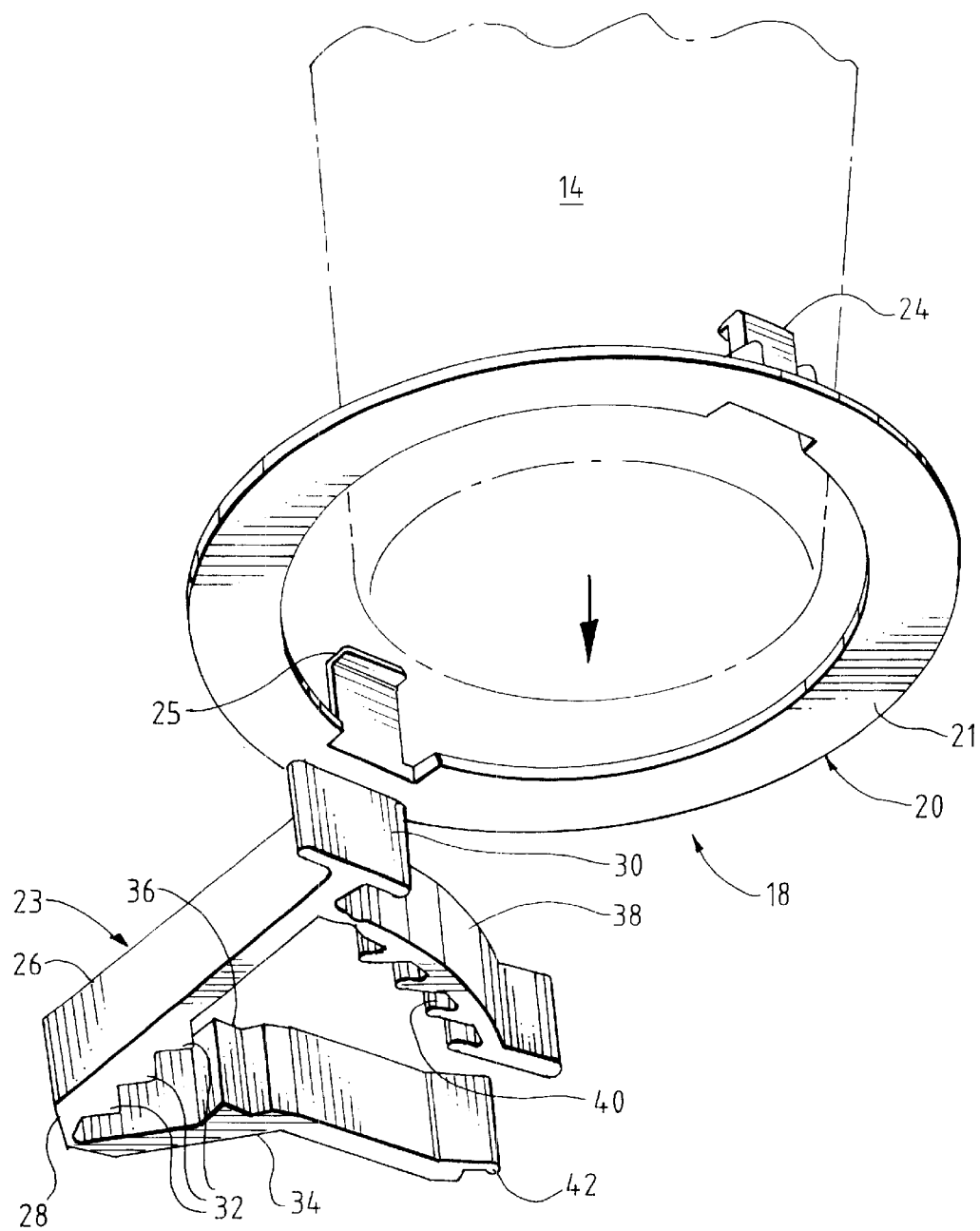
FIG. 2 is a plan view, partly in phantom, showing the container carrying clamp system, with the container shown in phantom, showing the manner in which the container would be inserted into the container carrier and the manner in which the container carrier is associated with the clamping portion of the device.
Figure 3:
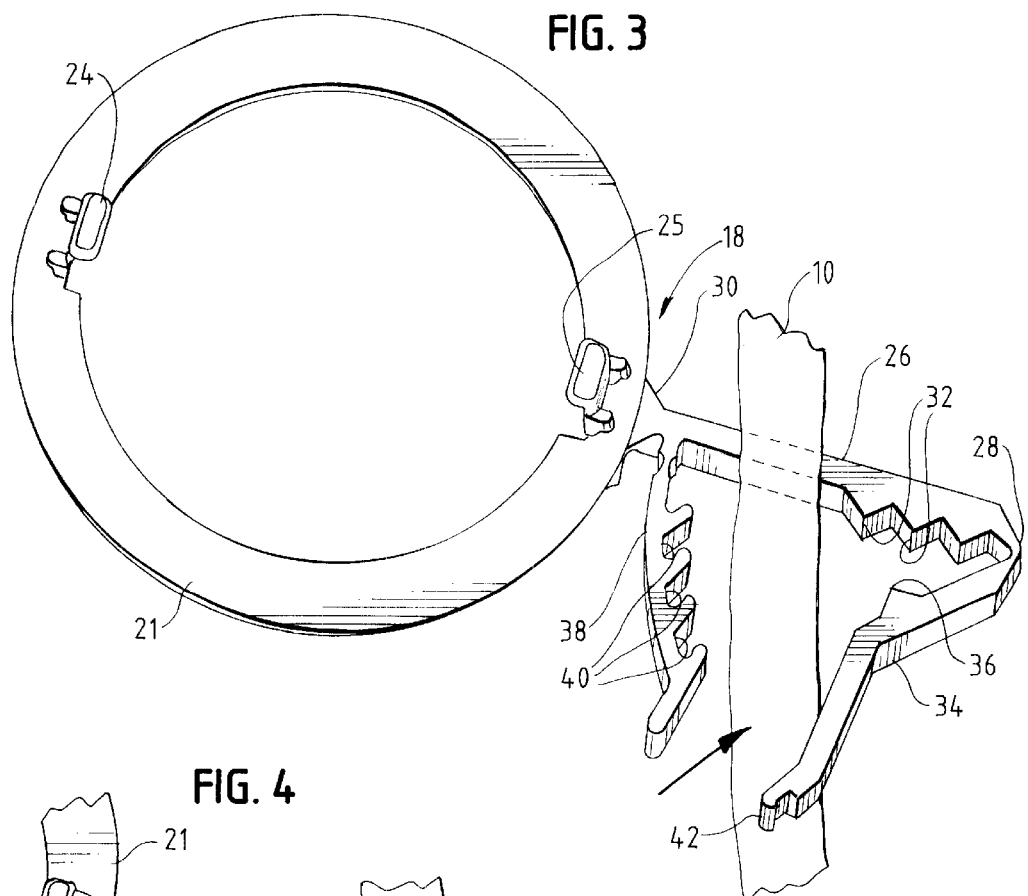
FIG. 3 is a top view showing the container carrier system including the clamping device in the open position for the insertion of an appropriate leash therein.

The container carrier system 18 is better illustrated in FIG. 2 of the drawings. As shown in FIG. 2, the container carrier 18 includes a first portion 20 which is intended to carry the container 14 therein. In this embodiment, the first portion 20 intended to carry the container is in the format of ring 21 which is connected at one point along its surface to a clamp assembly 23. The ring is also shown to include a pair of container hooks 24 and 25 respectively, such that once the container 14 is inserted into the ring, it will be slid downwardly until the container hooks 24 and 25 hook onto the lip of the container 14.

The clamp assembly 23 is shown to be formed by a mounting arm 26 having an outer end 28 and an inner end 30. The mounting arm 26 is shown to also include a plurality of locking teeth 32 formed along the inner surface thereof and adjacent to the outer end 28 thereof. In addition, there is provided a locking arm 34 pivotally secured to the outer end 28 of the mounting arm 26. The locking arm is provided with a lock flange 36 carried along the inner side thereof, and adapted such that as the locking arm 34 is pivotally moved toward the mounting arm 26, the leash 10 will be locked between the lock flange 36, and the locking teeth 32 in the manner illustrated in FIG. 1 and FIGS. 4 and 5 of the drawings. The mounting arm 26 is further provided with a lock bar 38 which is secured thereto, the lock bar 38 including a plurality of sequential arrest notches 40. The outer end of the locking arm 34 is provided a lock stop 42 which is designed to cooperate with the arrest notches 40 in the lock bar 38 incident to the clamping and locking procedure.

Figure 4:
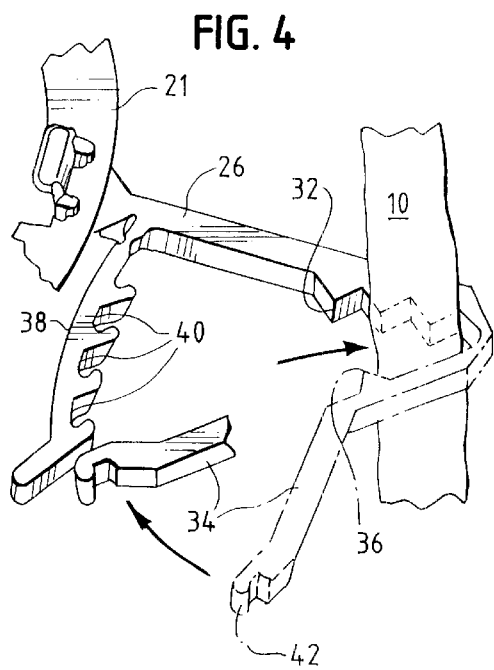
FIG. 4 shows the animal leash appropriately placed within the clamp portion of the container carrier with the clamp being inserted to a locked position.
Figure 5:
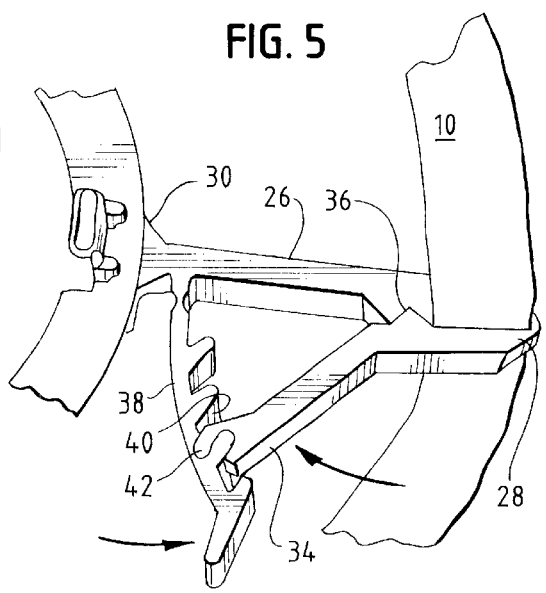
FIG. 5 shows the clamping device in the fully clamped position with the leash securely held in the clamp portion of the device.

The clamping and locking procedure is more fully illustrated in FIGS. 4 and 5 of the drawings. The locking arm 34 is pivotally moved away from the mounting arm 26 in order to insert the leash 10 therein. The leash is then moved to the area or space between the locking arm 34 and the mounting arm 26 as shown in the FIG. 4. The locking arm 34 is then pivotally moved back toward the mounting arm 26 thereby drawing the lock flange 36 toward the locking teeth 32 thereby to secure the leash 10 therebetween. The clamp assembly is designed such that as the locking arm 34 is moved toward the mounting arm 26 to lock the leash 10 therebetween, the lock stop 42 will move into one of the associated arrest notches 40 to arrest and lock the lock stop 42 in one of the notches thereby securing the leash 10 between the lock flange 36 and the locking teeth 32 as shown in FIG. 5 of the drawings. The ring 21 is designed to carry the container 14 in the manner previously described, such that once the container 14 is inserted into the ring 21 with the container hooks 25 hooked over the lip of the container 14, the assembly may then be locked onto the pet leash 10 and is then ready for use by the owner. Once pet waste is retrieved by the pet owner, whether in a bag, glove or any other device, the container lid 16 is removed from the container 14 to allow insertion of the collected waste therein and the lid reengaged to safely and securely contain the waste therein. The pet owner may then continue to air and walk the pet until he finds an appropriate waste dumpster to empty the container therein.

For ease of use, and as previously been indicated, the containers 14 may be easily removed from the ring 21 by simply unhooking the container hooks 24 and 25 from the lip of the container 14, to remove the container 14 from the ring 21 and may then be emptied into an appropriate permanent waste dumpster or container.

It will be noted that the ring 21 is mounted to the mounting arm 26 adjacent the inner end 30 thereof while the locking arm 34 is mounted to the mounting arm 26 adjacent the outer end 28 thereof. It is contemplated that the entire container carrier 18 may be formed from a suitable plastic material for ease of manufacturing. In this embodiment, the entire container carrier including the ring 21 as well as the clamp assembly 23 can be formed as an integral unit.

Figure 6:
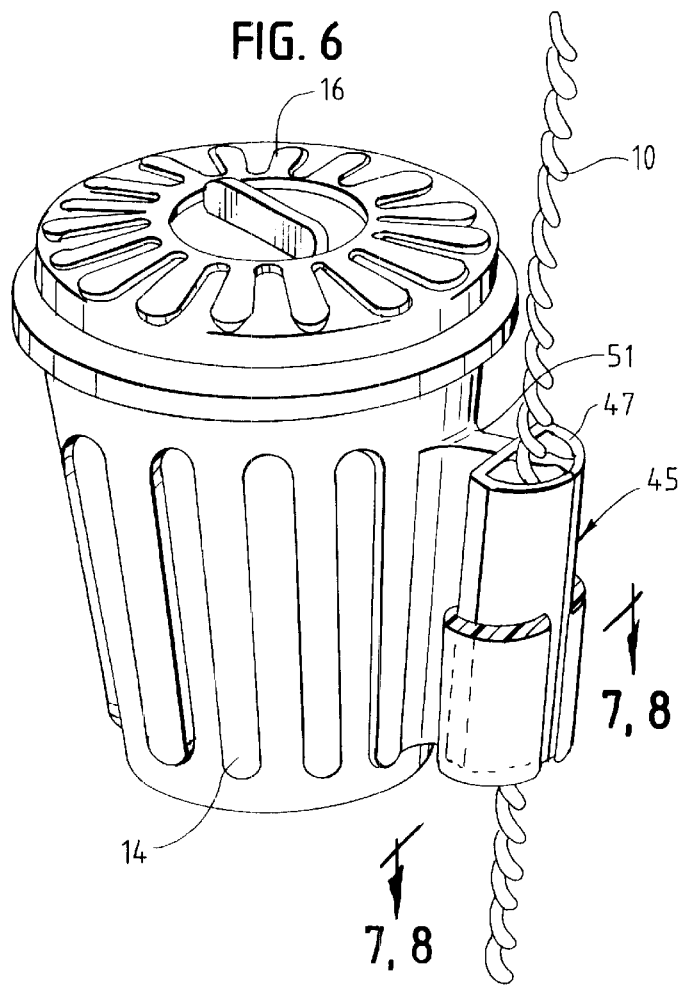
FIG. 6 shows an alternate embodiment of the portable container of the present invention wherein the carrier system is designed as an elongate tube which accommodates the pet leash therein by means of friction engaging arms.
Figure 7:
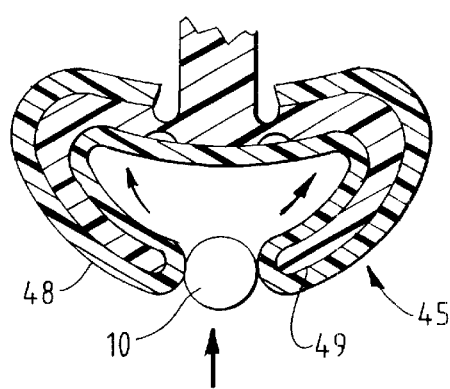
FIG. 7 is a cross sectional view showing the manner in which the container carrying system of FIG. 6 accommodates a leash being inserted therein taken along the lines 7—7 of FIG. 6.
Figure 8:
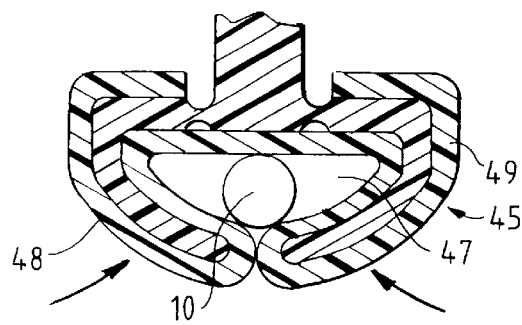
FIG. 8 is a cross sectional view showing completion of the insertion of the leash in the carrier tube of FIG. 6 taken along the line 8—8 of FIG. 6.

FIGS. 6 through 8 illustrate an alternative embodiment of the present invention. For ease of description, like numerals will refer to like parts.

In this embodiment, the container 14 includes a removable lid 16. Along a portion of the sidewall of the container 14, an elongate d-shaped tube 45 is positioned. The d-shaped tube 45 includes an inner chamber 47 through which a leash may be passed. The d-shape tube 45 is shown to be slotted down the middle in order to form a pair of adjoining convex arms 48 and 49 respectively. The d-shaped tube 45 is connected to the container 14 by means of a mounting flange 51 which may be secured to the container 14 by appropriate means. It is contemplated that the entire flange 51 and d-shaped tube 45 could be molded as a part of the container 14.

As shown in FIGS. 7 and 8 of the drawings, the convex arms 48 and 49 may be stretched apart a distance in order to permit the leash 10 to be inserted through the slotted opening and once positioned within the inner chamber 47, the convex arms 48 and 49 would then retract to their original positions thereby frictionally engaging the pet leash therein. It will therefore be appreciated that the container 14 may be carried on any pet leash, which for purposes of illustration in FIG. 6, is in the form of a chain leash.

Figure 9:
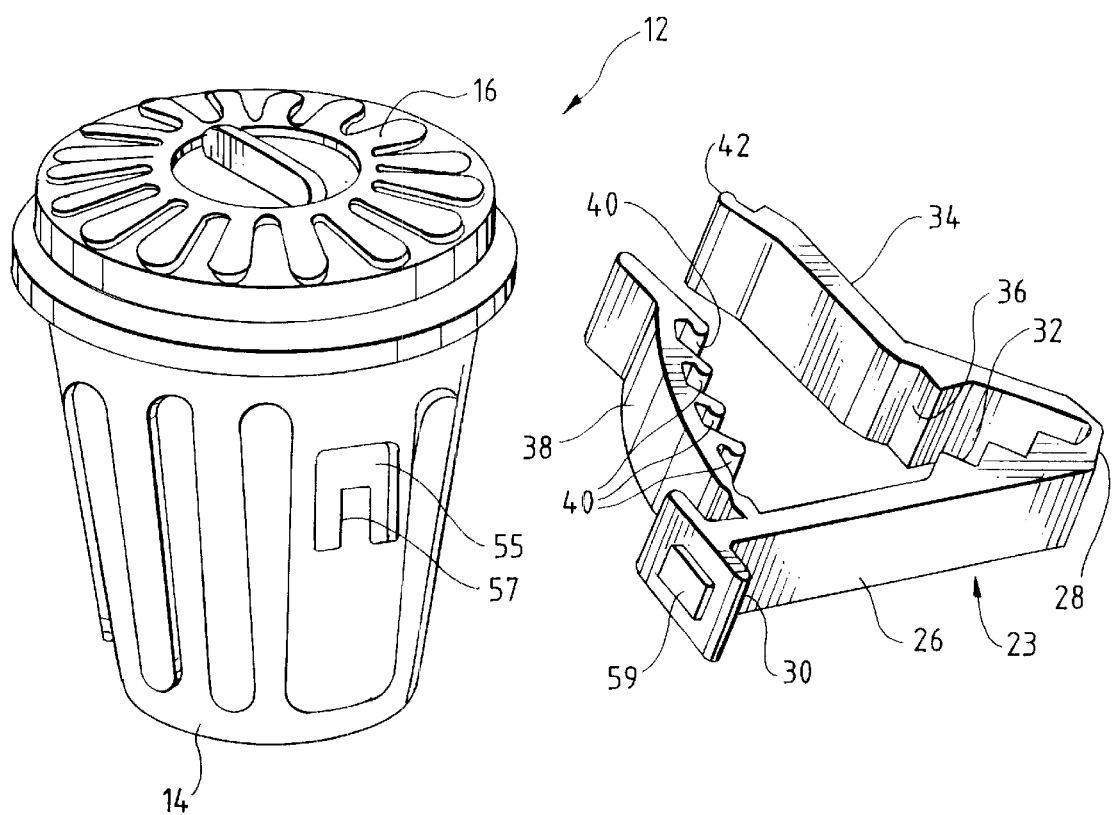
FIG. 9 is a plan view showing still a further embodiment of the present invention wherein the container is provided with a slotted pouch, and the container carrier is provided with a flanged extension adapted for insertion through the slot into the slotted pouch thereby to carry the container thereon.

FIG. 9 illustrates still another preferred embodiment of the present invention. Once again, like numerals will be utilized to describe like parts.

In the embodiment shown in FIG. 9, there is shown a container 14 which again is provided with a removable lid 16. As was illustrated with respect to the prior embodiments, the clamp assembly 23 is shown to be formed by means of a mounting arm 26 having an outer end 28 and inner end 30. The outer end 28 includes a locking arm 34 pivotally mounted thereon, while the inner end 30 of mounting arm 26 is provided with a lock bar 38 which contains a plurality of arrest notches 40. The outer end of the locking arm 34 is also provided with a lock stop 42 which will lock into one of the arrest notches 40 when lockingly engaged to a leash.

In this embodiment, the container 14 is provided with a slotted pouch 55 which in the preferred embodiment, would be formed as a part of the sidewall of the container 14. The pouch 55 includes a slot 57. The clamp assembly 23 is provided with a flanged extension 59 carried along the inner end 30 of the mounting arm 26.

As shown in FIG. 9, in the preferred embodiment, the slotted pouch 55 is basically rectangular in configuration, and the flanged extension 59 is a mating rectangular configuration. The flanged extension 59 is carried in an extended position away from the inner end 30 of the mounting arm 26 by means of a carrying stud not shown, in order to permit the flanged extension 59 to be inserted into the pouch 55 via the slot 57. In view of the rectangular configuration of the pouch 55 and the mating flanged extension 59, the container 14 will be secured to the clamp assembly 23 in a set position and will have no tendency to rotate when being carried on the clamp assembly 23. In this connection, any type of geometrical configuration can be utilized for the pouch and the flange extension so long as the two have mating configurations.

Again, the purpose of having mating geometric configurations is to prevent the container 14 from rotating relative to the clamp assembly 23 when hooked onto the clamp assembly 23 incident to the transporting process. It will be appreciated that with respect to the embodiment shown in FIG. 9, when the pet owner has completed the use of the container carrier system 12, the container 14 may easily be unhooked from the clamp assembly 23 in order to accommodate the removal of the contents of the container 14 there from.

The essence of the present invention has therefore been accomplished by providing a container which is removably engageable to a clamp assembly, which in turn is universally clampable to any format of pet leash. It is obvious from the above description that the clamp assembly permits a leash of any type of configuration to be inserted as between the mounting arm and the locking arm, to securely hold the clamp in position on the pet leash. A container carrier is provided for connecting with the container in order to carry the container in removable fashion from the container carrier. In this manner, the container may be easily unclamped or disengaged from the clamp assembly in order to permit the pet waste which has been inserted into the container to be removed therefrom into a permanent container. Furthermore, by having the container easily removable from the clamp assembly, the pet owner need not handle the animal waste and the container in order to remove the same therefrom. The container may simply be disengaged from the clamp assembly, the lid removed from the container, and the container turned upside down in order to have the waste placed into a permanent waste container such as a dumpster, garbage can or the like. The owner need not handle the waste package contained within the container. In addition, the easy removability of the container from the container carrier permits the owner to clean and re-install the container onto the carrier.

Furthermore, in the event that any animal waste rubs onto the surface of the inner portion of the container, the container is easily removable from the clamp assembly for ease of cleaning.

It will also be appreciated that the present invention provides the pet owner with the ability to retrieve and collect the animal waste from the pet owner's animal while affording the pet owner the privilege of having the collected waste carried within the container such that when the owner continues to air the pet, it is not necessary for the pet owner to physically carry the animal waste in a bag, glove or other collection device. Further, once the animal waste in the collected bag or glove is positioned within the container and the lid applied, the container with lid will contain the odor as well as the unsightliness of the animal waste until the owner can arrive at a permanent waste container for disposition of the animal waste.

Thus, there has been provided a portable animal waste container which is easily attachable to any format of pet leash for the convenience of the pet owner in order to temporarily transport pet waste to a permanent waste container. While the invention has been described in connection with specific embodiments, it is evident that many alternative modifications may be made therein and those variations will be apparent to those skilled in the art in light of the foregoing description. Accordingly, it is intended to embrace all such alternatives, modifications and variations as fall within the spirit and scope of the appended claims.

What is claimed is:

1. A portable container for carrying and concealing animal waste comprising in combination,
 a container formed by a continuous side wall and a bottom wall and having an open top end and closeable by a removable lid,
 said container formed in a defined geometric configuration,
 a container carrier having carrying means for connecting with and carrying said container,
 said container carrier including a first portion which is formed in a defined geometric configuration to matingly receive and carry said container,
 said container carrier including a second portion,
 said second portion including adjustable clamping means for lockingly engaging onto any format of a pet leash thereby to lock said container carrier onto a pet leash and carry said container therein,
 said adjustable clamping means comprising a mounting arm having an inner end mounted on and extending outwardly from said first portion of said container carrier to an outer end,
 said mounting arm having an interior side provided with a plurality of locking teeth along the length thereof,
 a locking arm pivotally mounted on the outer end of said mounting arm and adapted to pivot towards said interior side of said mounting arm,
 said locking arm carrying at least one lock flange which lockingly cooperates with said locking teeth when said locking arm is pivotally moved toward said mounting arm to engage a leash therebetween,
 an adjustable lock stop associated with said locking arm thereby to lock said locking arm in any one of a plurality of said stop position to engage and lock a pet leash between said locking teeth and lock flange to permit said container carrier and associated container to be lockingly engaged on a pet leash.

2. The portable carrying container as set forth in claim 1 above wherein said locking arm has an inner end and an outer end, said inner end forming a pivotal joint with said mounting arm and said outer end including a stop boss,
 a lock bar mounted adjacent the inner end of said mounting arm and extending outwardly from the interior side thereof,
 said lock bar includes a plurality of sequential arrest notches,
 said arrest notches being in cooperative arrangement with said stop boss such that said stop boss may be positioned in any one of said sequential arrest notches as said locking arm is pivoted toward said mounting arm,
 whereby the distance of the locking position established between the locking teeth and lock flange may be adjusted to accommodate various pet leashes.

3. The portable carrying container as set forth in claim 2 above, wherein said mounting arm includes at least two locking teeth in spaced apart relation and said lock flange is positioned and arranged to lock in position between said respective locking teeth.

4. The portable carrying container as set forth in claim 3 above, wherein the lock position of said lock flange relative to said locking teeth may be varied by the positioning of said stop boss in any one of the appropriate arrest notch.

5. The portable carrying container as set forth in claim 3 above, wherein said lock bar is pivotally mounted on the inner end of said mounting arm thereby to be pivotally moveable toward said mounting arm.

* * * * *